The invention described herein may be manufactured and used by or for the Government of the United States of America for governmental purposes without the payment of any royalties thereon or therefor.

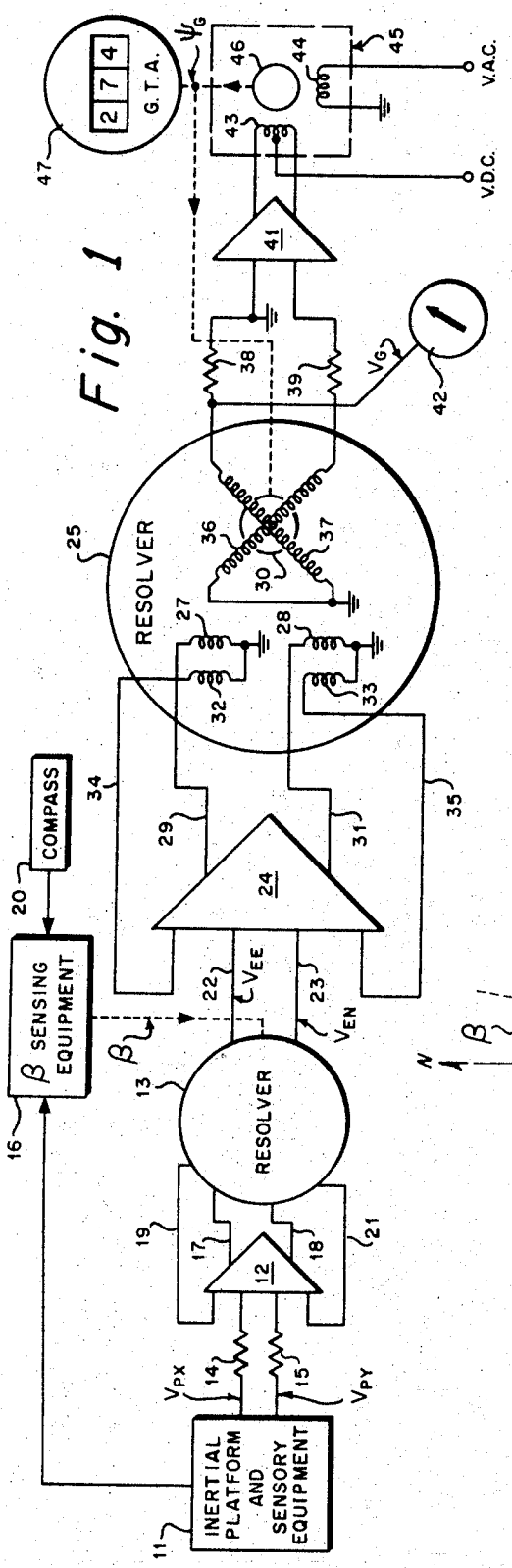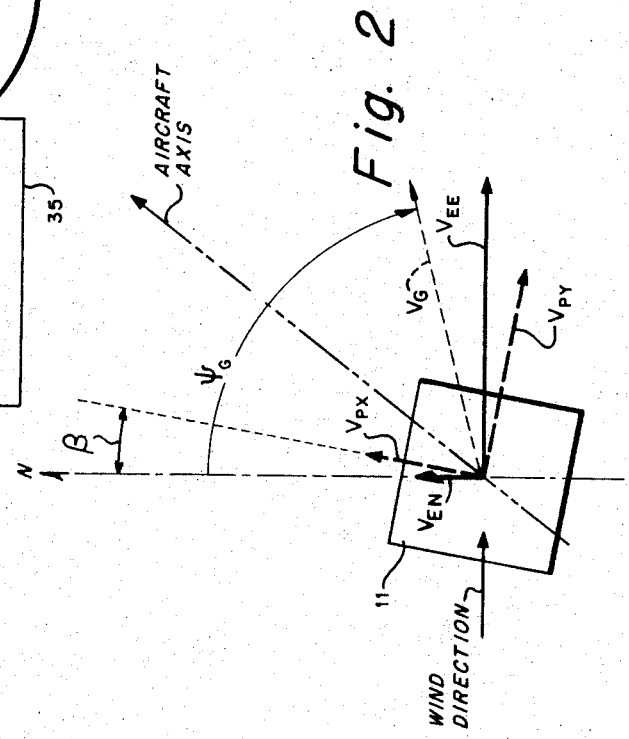
INVENTOR.
JAMES N. WEIKERT
ATTORNEY 3,351,276
APPARATUS FOR INERTIALLY DERIVING GROUND TRACK ANGLE
James N. Weikert, Boston, Mass., assignor to the United States of America as represented by the Secretary of the Navy
Filed Jan. 27, 1966, Ser. No. 523,465
5 Claims. (Cl. 235—61)

The present invention relates to navigational systems and more particularly to an inertial means of determining ground track angle and ground track velocity.

In order to navigate an aircraft on a straight course, it is necessary not only to know the longitude and latitude of the aircraft, but it is also necessary to know the heading or direction from true North along which the aircraft is flying and the speed of the aircraft. The heading information, however, is not always a true indication of the aircraft's flight path along a ground reference since high winds or gales tend to push or slide the aircraft off course. This presents a serious problem to the navigator who must maintain an accurate source along a ground reference since as the aircraft is proceeding along its normal heading, winds are constantly sliding the aircraft off in a different direction. In order to correct for this error, it is necessary for the navigator to constantly check and recheck his position in latitude and longitude to assure a proper flight path along the ground reference.

In the case of an aircraft which is carrying bombs to a target, it is particularly important that the aircraft maintain a true heading with respect to the target location so that the bombs will be dropped on the target. Similarly, in the case of photo reconnaissance flights it is necessary to maintain a straight flight pattern so that parallel grid patterns over the target area will be obtained and consequently a true picture of the photographed area will result.

At present the navigator of the aircraft is required to make numerous computations of his position so as to determine the correct heading of the aircraft. Such computations are not only tedious and subject to error, but also require considerable time to determine the actual heading of the aircraft. The prior art has attempted to solve the aforementioned problem by using inertial systems which resolve the X and Y velocity components of an inertial platform by the wander angle $\beta$ (beta) which is the deviation of the X axis from the true North to determine the true North and East components of the aircraft velocity. This information, however, still remains in vector coordinate form and its use by a bomber or navigator requires calculations to determine the actual ground track angle and ground speed.

The present invention solves the aforementioned problems by providing automatic means for computing both the ground track angle and the aircraft ground speed. The present invention also provides for a digital readout display of the ground track angle and visual indication of the aircraft ground speed.

An object of the present invention is therefore to provide automatic means for computing the ground track angle and to provide a visual display to the navigator or bomber of the true ground track angle.

Another object of the present invention is to provide a continuous indication of the aircraft ground speed along its particular heading. Additionally, it is to provide an easily adaptable device which may be connected into present inertial systems for indicating aircraft ground track angle and ground speed information.

Other objects and many of the attendant advantages of this invention will be readily appreciated as the same becomes better understood by reference to the following detailed description when considered in connection with the accompanying drawing wherein:

FIG. 1 shows a schematic and block diagram of one embodiment of the invention; and FIG. 2 illustrates a vectorial representation of the aircraft ground speed and ground track angle.

The present invention comprehends, among other things, the means for inertially determining the ground track angle and ground speed of an aircraft.

Referring now to the drawing, there is shown in FIG. 1, an inertial platform and associated sensory equipment 11 which are located within an aircraft. The function of the inertial platform is to provide an indication of the X and Y orthogonal components of velocity of the aircraft with respect to true North and true East; however, due to inherent errors in the gyroscopic equipment located within the platform, the X and Y components of velocity derived from the platform deviate from the true North and true East by a small amount. The deviation from true North is commonly called the wander angle $\beta$ and could represent a considerable error in the flight path of the aircraft, and accordingly, cause the aircraft to veer off course. In order to eliminate this error, a resolver 13, with the detailed structure shown in resolver 25, is employed in such a manner as to rotate the X and Y velocity component vectors from the inertial platform into the true North and East components of velocity. This rotation is accomplished in the following manner.

The X and Y orthogonal velocity components from the inertial platform 11 are coupled to a pair of identical amplifiers 12 through resistors 14 and 15. The twin amplifiers 12 provide both voltage and power gain to the signals from the inertial platform 11 to drive the stator windings of the resolver 13.

The basic operation of resolver 13 is exemplified by its ability to shift the phase angle of the orthogonal signals appearing on the stator windings by an amount equal to the angle of rotation of the rotor.

For example, referring more particularly to the detailed structure shown in resolver 25, if a pair of orthogonal input voltages is applied to stator windings 27 and 28, the output of rotor windings 36 and 37 will also be a pair of orthogonal signals, but shifted in phase with respect to the input signals by an amount equal to the angular displacement of the rotor 30.

Resolvers 13 and 25 are typically of the compensated type; that is, compensator windings 32 and 33 are employed in a negative feedback amplifier circuit to stabilize the resolver operation against temperature variations and changes in the resolver parameters.

Twin amplifier 12 is connected to the stator windings of resolver 13 through conductors 17 and 18 and the compensation signals from resolver 13 are connected to twin amplifier 12 through conductors 19 and 21 so as to provide negative feedback to the amplifiers and thereby improve the accuracy of resolution of resolver 13.

The X and Y velocity components shown as $V_{px}$ and $V_{py}$, respectively, in FIG. 2 are resolved by the wander angle $\beta$, the angular deviation of the X axis of the inertial platform from true North, to obtain the true North and East components of the aircraft velocity. The wander angle $\beta$, is derived from $\beta$ sensing or computing equipment 16 which may, for example, be similar to that described in Inertial Navigation Systems by Charles Broxmeyer, McGraw-Hill 1964, on pages 128 and 129 and illustrated in FIGS. 7–4 on page 130. As described therein, the wander angle $\beta$ is designated by $u'$ and is derived from signals from the inertial platform. This initial alignment or "caging," as it is also referred to, may utilize a compass 20 to provide a rough physical alignment of the platform prior to mathematical gyrocompassing. The compass 20 is merely illustrative of one technique which may be used for this caging operation, others being optical alignment and physical alignment, as described in the above text.

The output from the $\beta$ sensing equipment is then used to rotate the rotor of resolver 13 in such a manner as to cause the X and Y velocity components $V_{px}$ and $V_{py}$, respectively, to be rotated by an amount equal to the wander angle $\beta$. The outputs of resolver 13 are then the true North and East components of velocity relative to the earth's reference, as shown in FIG. 2 by vectors $V_{EN}$ and $V_{EE}$, respectively.

A better understanding of how the X and Y velocity components of the inertial platform are resolved to the true North and East components of the aircraft velocity can be had by an understanding of the analytical relationship between these vectors. The following equations are used to describe the aforementioned relationship:

(a) $\qquad V_{EN} = V_{px} \cos \beta - V_{py} \sin \beta$
(b) $\qquad V_{EE} = V_{py} \cos \beta + V_{px} \sin \beta$ From the foregoing equations it can be seen how X and Y velocity components from the inertial platform 11 are resolved into the true North and true East velocity components $V_{EN}$ and $V_{EE}$, respectively. These outputs are coupled to a twin amplifier 24 through conductors 22 and 23. Twin amplifier 24 is substantially similar to twin amplifier 12 and provides sufficient amplification to control a resolver 25. Stator windings 27 and 28 are connected to the output of amplifier 24 through conductors 29 and 31. Compensating windings 32 and 33 are connected to amplifier 24 through conductors 34 and 35. Rotor windings 36 and 37 are wound on rotor 30 and are connected to the outputs of resolver 25.

Resolver 25 functions in a similar manner to resolver 13 and accepts the inputs $V_{EN}$ and $V_{EE}$ and resolves them into the resultant vector $V_G$ which is a measure of the aircraft ground velocity. The angular displacement of vector $V_G$ from the true North direction is shown as $\varphi_G$ and represents the true ground track angle of the aircraft.

A better understanding of how resolver 25 resolves the $V_{EN}$ and $V_{EE}$ components into the resultant vector $V_G$ and the associated angle $\varphi_G$ can best be expressed by the following equation:

(c) $\qquad \overrightarrow{V_G \angle \varphi_G} = \overrightarrow{V_{EN}} + \overrightarrow{V_{EE}}$ As shown in Equation (c) the resultant vector $V_G$ and its associated angle $\varphi_G$ is equivalent to the vectorial summation of $V_{EN}$ and $V_{EE}$.

The outputs of resolver 25 are coupled to the inputs of amplifier 41 through resistors 38 and 39. One input of amplifier 41 is grounded so as to provide a reference level for the voltage appearing at an indicator 42 which provides an indication of the aircraft ground velocity $V_G$.

Amplifier 41 is used to drive a field winding 43 of a motor 45. Field winding 43 has a center tap which is connected to a source of D.C. voltage to provide the D.C. field current. A source of alternating current voltage is used to energize an excitation winding 44 of motor 45. A rotor 46 of motor 45 is mechanically connected to a digital readout indicator 47 which provides an indication of the ground track angle $\varphi_G$. Rotor 46 is also mechanically connected to rotor 30 of resolver 25 and causes the resolver rotor windings to rotate in accordance with the rotation of the rotor 46, thereby causing the voltage appearing on rotor winding 36 to be nulled. The voltage null is achieved as a result of the closed feedback loop around resolver 25, amplifier 41 and motor 45. The digital readout indicator 47 will then indicate the ground track angle of the system and the meter 42 will indicate the ground velocity.

The operation of the invention will now be described with particular reference to its application in determining the ground track angle and ground speed of an aircraft.

Assume that a navigator is attempting to maintain an aircraft on a straight course over a particular terrain and at the altitude at which the aircraft is flying, there are strong winds or gales from such a direction as to tend to slide the aircraft off course. Assume further that the aircraft is flying along a course as shown in FIG. 2 which is generally indicated as the aircraft axis and that the wind direction forms an acute angle with said axis as measured with respect to true North. Assume further that the inertial platform 11 is oriented as shown in FIG. 2 and that the X and Y velocity components from the inertial platform are not properly oriented with respect to true North and true East and that a wander angle $\beta$ does in fact exist. The present invention will then resolve these components into the aircraft ground speed and ground track angle as indicated below.

The X and Y velocity components from the inertial platform are coupled through amplifier 12 to the resolver 13 which resolves these components into the true North and East components $V_{EN}$ and $V_{EE}$, respectively. These components are then coupled through amplifier 24 to resolver 25 where they are resolved into the true ground speed and ground track angle. The ground speed is recorded on indicator 42 and the ground track angle is recorded on digital readout indicator 47. In this manner the navigator is provided with a continuous visual display of the aircraft ground speed and ground track angle. If the aircraft is moved off course as a result of the high gales or winds, he can immediately make the necessary correction to his navigation equipment so as to maintain the aircraft on a proper course, without making any computations.

The present invention accordingly provides automatic means for computing both the ground track angle and the aircraft ground speed so that it is readily usable by the navigator by mere visual inspection.

For the purpose of further explaining the operation of the invention, the following example will be used to illustrate how the aircraft ground track angle and velocity are determined. Assume that the X axis velocity component from the inertial platform $V_{px}$ is 183 miles per hour, and that the Y component $V_{py}$ is 407 miles per hour. These components may then be resolved into the true North and East components of velocity by resolver 13. For example, if the wander angle $\beta$ is 10 degrees, the true East and true North components of velocity may be determined by using Equations (a) and (b) and substituting the aforementioned numerical values for $V_{px}$, $V_{py}$ and $\beta$. It will then be found that $V_{EN}$ is equivalent to 109.5 miles per hour and $V_{EE}$ is equivalent to 433 miles per hour. By substituting the values thus obtained for $V_{EN}$ and $V_{EE}$ into Equation (c), the resultant vector $V_G$ and the associated ground track angle $\varphi_G$ will be determined. In this case it will be found that $V_G$ is equivalent to 448 miles per hour and $\varphi_G$ is equivalent to 75.9 degrees East of North. As the aircraft either increases or decreases its speed or deviates from a prescribed course, these changes will be reflected in the digital readout of the ground track angle and the visual display of the aircraft ground speed.

From the above description it can be readily appreciated that the present invention describes a novel means for determining ground track angle and ground speed of an aircraft and displaying this information to a navigator so that the aircraft can be navigated over a prescribed course with considerable accuracy.

Obviously, many modifications and variations of the present invention are possible in the light of the above teachings. It is therefore to be understood that within the scope of the appended claims, the invention may be practiced otherwise than as specifically described.

What is claimed is:

1. A device for determining the ground track angle of an aircraft comprising:

an inertial guidance system having orthogonal velocity component outputs with respect to true North in a coordinate frame of reference;

means for computing the angular deviation of said velocity components from true North; and resolver means receiving said velocity component outputs and responsive to said angular deviation for providing said ground track angle.

2. The device of claim 1 wherein said resolver means comprises:

a first resolver receiving said velocity component outputs from said inertial guidance system for providing the true orthogonal components of aircraft velocity; and a second resolver receiving the true orthogonal components from said resolver for providing said ground track angle.

3. The device of claim 2 further comprising:

an indicator means coupled to said second resolver for displaying said ground track angle.

4. The device of claim 2 wherein said means for computing comprises:

means responsive to said inertial guidance system for providing a continuous computation of the deviation from true North of the coordinate frame of reference to said first resolver.

5. The device of claim 4 further comprising:

means connected to the output of said second resolver for displaying said ground speed.

References Cited

UNITED STATES PATENTS

| | | |
|---|---|---|
| Re. 25,097 | 11/1961 | Ciscel. |
| 2,870,979 | 1/1959 | Tribken et al. |
| 2,908,902 | 10/1959 | Gray et al. _____ 33—222.75 |
| 2,914,763 | 11/1959 | Greenwood et al. _____ 73—178 |
| 3,002,282 | 10/1961 | Rumrill _____ 235—61 |
| 3,029,016 | 4/1962 | Shapiro et al. |
| 3,087,333 | 4/1963 | Newell _____ 235—61 |
| 3,147,626 | 9/1964 | Fischer et al. _____ 33—226 |
| 3,158,340 | 11/1964 | Sellers. |
| 3,205,346 | 9/1965 | Wright et al. _____ 235—61 |
| 3,217,150 | 11/1965 | Wright et al. _____ 235—61 |

RICHARD B. WILKINSON, *Primary Examiner.*

S. A. WAL, H. B. KATZ, *Assistant Examiners.*